US012109824B2

(12) United States Patent
Llorach To et al.

(10) Patent No.: US 12,109,824 B2
(45) Date of Patent: Oct. 8, 2024

(54) PRINT APPARATUS AND METHODS

(71) Applicant: HEWLETT-PACKARD DEVELOPMENT COMPANY, L.P., Spring, TX (US)

(72) Inventors: Marcel Llorach To, Sant Cugat del Valles (ES); Ricardo Sanchis Estruch, Sant Cugat del Valles (ES); Eduardo Martin Orue, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 119 days.

(21) Appl. No.: 17/773,866

(22) PCT Filed: Dec. 20, 2019

(86) PCT No.: PCT/US2019/067817
§ 371 (c)(1),
(2) Date: May 3, 2022

(87) PCT Pub. No.: WO2021/126241
PCT Pub. Date: Jun. 24, 2021

(65) Prior Publication Data

US 2022/0371347 A1 Nov. 24, 2022

(51) Int. Cl.
*B41J 29/377* (2006.01)
*B41J 11/02* (2006.01)

(52) U.S. Cl.
CPC ............ *B41J 29/377* (2013.01); *B41J 11/02* (2013.01)

(58) Field of Classification Search
None
See application file for complete search history.

(56) References Cited

U.S. PATENT DOCUMENTS

| | | | | |
|---|---|---|---|---|
| 5,058,876 | A | 10/1991 | Grossmann | |
| 6,000,775 | A | 12/1999 | Muraki | |
| 7,578,629 | B2 | 8/2009 | Kruijt | |
| 8,690,290 | B2 | 4/2014 | Masuda | |
| 9,162,488 | B2 | 10/2015 | Lo | |
| 9,731,518 | B2 | 8/2017 | Luedeman | |
| 2008/0258375 | A1 | 10/2008 | Jensen | |
| 2009/0044371 | A1* | 2/2009 | Yoo | A47L 5/32 15/327.2 |
| 2010/0285082 | A1 | 11/2010 | Fernandez | |
| 2013/0229458 | A1* | 9/2013 | Masuda | B41J 11/00214 347/30 |
| 2020/0307221 | A1* | 10/2020 | Masuda | B41J 2/1714 |
| 2022/0040986 | A1* | 2/2022 | Kobayashi | B41J 29/38 |

FOREIGN PATENT DOCUMENTS

| | | |
|---|---|---|
| EP | 1592519 | 11/2005 |

* cited by examiner

*Primary Examiner* — Alejandro Valencia
(74) *Attorney, Agent, or Firm* — Jordan IP Law, LLC

(57) ABSTRACT

Print apparatus comprises: a platen to support a print substrate; a print head to apply print agent to a print substrate supported by the platen, the print head being movable relative to the platen to vary a distance therebetween; and a suction device having an inlet, the suction device to draw air from between the print head and the platen and into the inlet. The inlet of the suction device is movable with the print head to vary a clearance between the inlet and the platen.

13 Claims, 8 Drawing Sheets

PRINT APPARATUS AND METHODS

BACKGROUND

Print apparatus may be used to print representations, such as text or images, onto print substrates. Print apparatus may include a print head to apply print agent to a print substrate. Print quality may be affected by air currents between the print head and the print substrate during printing.

FIGURES

Various examples will be described below with reference to the following figures, wherein.

DESCRIPTION

Figure 1:
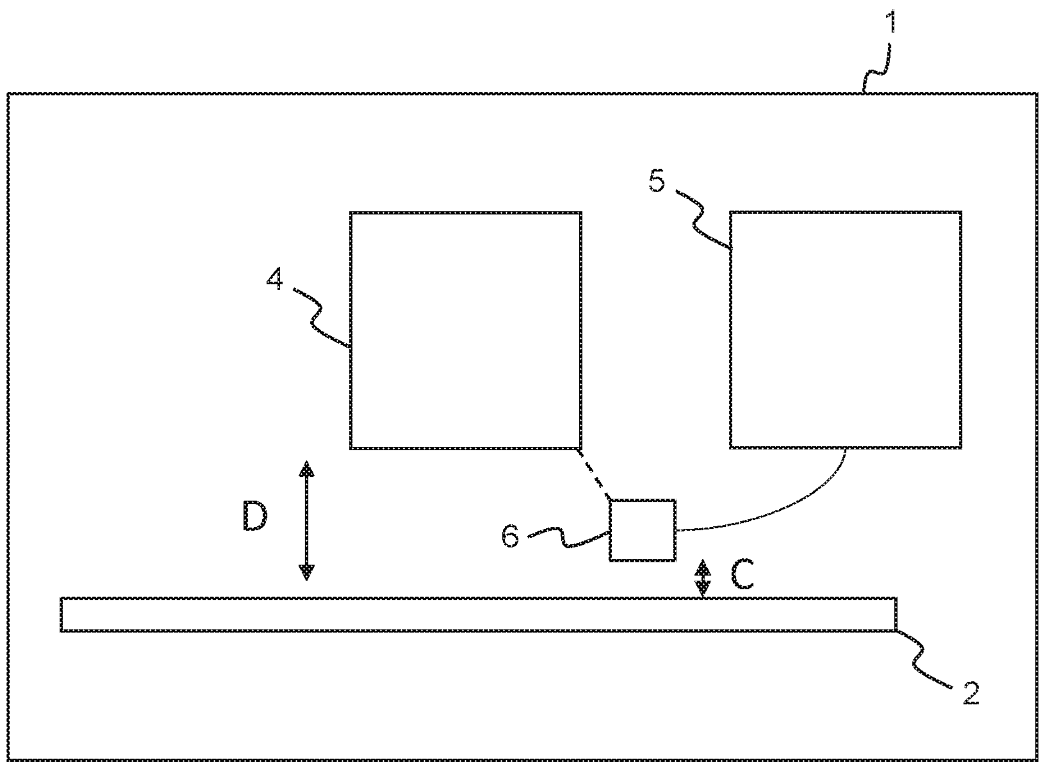
FIG. 1 is a schematic illustration of an example print apparatus.
Figure 2:
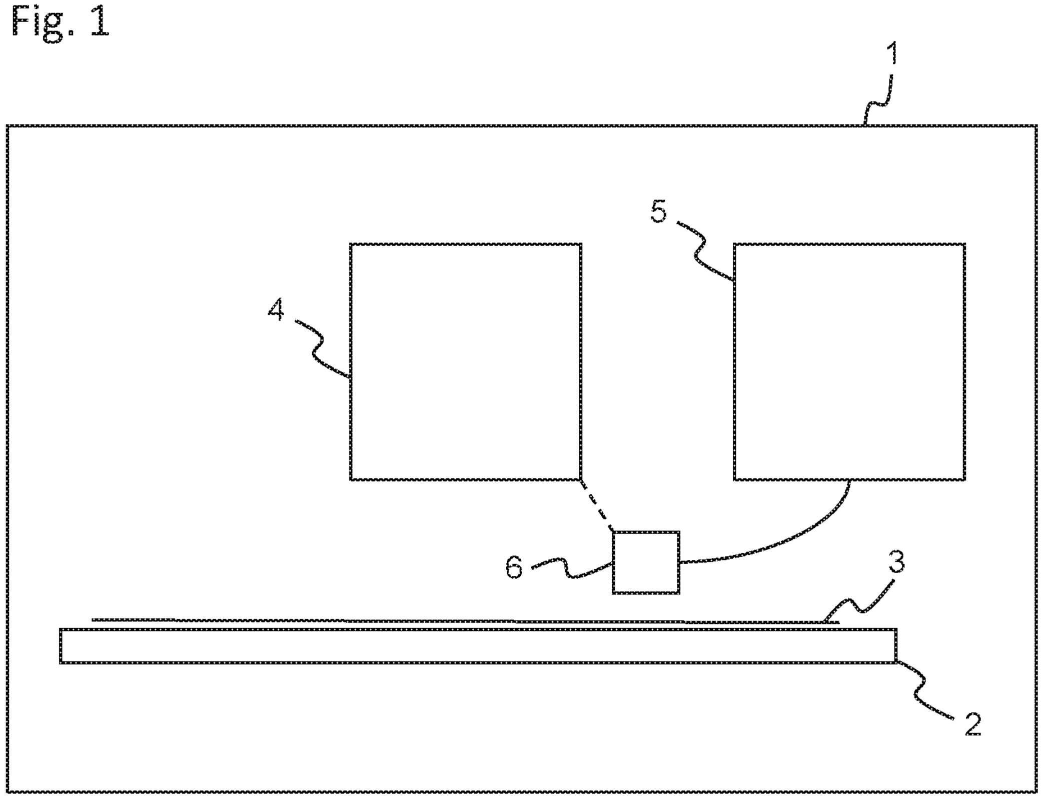
FIG. 2 is a further schematic illustration of the example print apparatus of FIG. 1.

FIGS. 1 and 2 are schematic illustrations of an example print apparatus 1. The print apparatus 1 comprises: a platen 2 to support a print substrate 3; a print head 4 to apply print agent to the print substrate 3 supported by the platen 2; and a suction device 5 having an inlet 6. The print head 4 is movable relative to the platen 2 to vary a distance (indicated as distance D in FIG. 1) therebetween. The suction device 5 is to draw air from between the print head 4 and the platen 2 and into the inlet 6. The inlet 6 of the suction device 5 is movable with the print head 4 (as illustrated schematically by a dashed line coupling the inlet 6 to the print head 4 in FIG. 1) to vary a clearance (indicated as clearance C in FIG. 1) between the inlet 6 and the platen 2. The location of the print substrate 3, when supported by the platen 2 during printing, is illustrated in FIG. 2.

Air currents between the print head 4 and the platen 2 may be generated when the print head 4 applies print agent to the print substrate 3. In particular, unsteady air flow (for example, turbulent air flow) between the print head 4 and the platen 2 may be caused by displacement of air between the print head 4 and the platen 2 as print agent is ejected from the print head 4. Unsteady air flow between the print head 4 and the platen 2 may result in inaccurate placement of print agent on the print substrate 3, potentially leading to a reduction in print quality. Actively drawing air from between the print head 4 and the platen 2 and into the inlet 6, however, may establish a steady air flow between the print head 4 and the platen 2, for example by reducing turbulence or causing a laminar flow, and thereby improving print quality.

The effectiveness of the steadying of the air flow may depend on the clearance C between the inlet 6 and the platen 2 as air is drawn into the inlet 6. For example, when the clearance C is relatively large (for example, greater than about 4 mm), more of the air drawn into the inlet 6 may flow from outside a printing zone (i.e. from outside the region between the print head 4 and the platen 2) than from within the printing zone. However, when the clearance C is relatively small (for example, no greater than about 4 mm), more of the air drawn into the inlet may flow from within the printing zone (i.e. from between the print head 4 and the platen 2) than from outside the printing zone. There may, therefore, be more effective steadying of the air flow (e.g. increased laminar flow or reduced turbulence) between the print head 4 and the platen 2 when the clearance C is relatively small. The suction device 5 may use less power to achieve a predetermined level of air flow steadying between the print head 4 and the platen 2 when the clearance C is relatively small in comparison to when the clearance C is relatively large.

Movements of the print head 4 may be controlled with a high level of precision, for example to enable precise control of the application of print agent to the print substrate 3. Accordingly, since the inlet 6 is movable with the print head 4 to vary the clearance C, the clearance C may also be set with a high level of precision. The print apparatus 1 may therefore enable precise targeting of a predetermined clearance C in order that more air is drawn into the inlet from within the printing zone than from outside the printing zone, thereby reducing the suction power used to achieve a predetermined level of steadying in the air flow between the print head 4 and the platen 2. This may be achieved without manufacturing the suction device 5 or any of its components to precise tolerances and/or without precisely controlling the position of the suction device 5 or any of its components within the print apparatus 1 (other than through movement of the print head 4).

The print apparatus 1 may comprise a component support structure such as a housing. The suction device 5 and the print head 4 may be separately mounted to the component support structure. That is to say, the suction device 5 and the print head 4 may be mounted to the component support structure independently of one another. The suction device 5 and the print head 4 may therefore be movable independently of one another.

In some examples, the inlet 6 is coupled to the print head 4 (as indicated by the dashed line connecting the inlet 6 to the print head 4 in FIG. 1) such that the inlet 6 is movable with the print head 4 to vary the clearance C. In some examples, the inlet 6 is located on (for example, is attached to or is part of) the print head 4 (or a print head assembly comprising the print head 4) such that the inlet 6 is movable with the print head 4 to vary the clearance C. In some examples, the inlet 6 is an open end of a conduit, for example a flexible conduit, and the suction device 5 is to draw air from between the print head 4 and the platen 2 through the inlet 6 into the conduit. A flexible conduit may permit movement of the open end with the print head 4 while the suction device 5 remains stationary.

In some examples, the inlet 6 is an open end of a nozzle, the suction device 5 being to draw air from between the print head 4 and the platen 2 through the nozzle. In some examples, movement of the print head 4 causes movement of the nozzle.

In some examples, the nozzle is coupled to the print head 4 such that the open end of the nozzle is movable with the print head 4 to vary the clearance C. In some examples, the nozzle is attached to, or forms part of, the print head 4 (or the print head assembly comprising the print head 4) such that the open end of the nozzle is movable with the print head 4 to vary the clearance C.

In some examples, the nozzle and the print head 4 are independent components of the print apparatus 1, although movement of the open end of the nozzle towards the platen 2 is coupled to (e.g. caused by) movement of the print head 4 towards the platen 2. For example, it may be that the nozzle is not located on (i.e., is not attached to and does not form park of) the print head 4 (or the print head assembly), In some examples, the open end of the nozzle is movable towards the platen 2 by engagement of the print head 4 (or the print head assembly) with a portion of the nozzle. For example, the nozzle may be arranged (e.g. positioned) such that engagement of the print head 4 (or the print head assembly) with a portion of the nozzle causes movement of the open end of the nozzle towards the platen 2.

For example, FIGS. 3 to 8 are schematic illustrations of example print apparatus in which the inlet 6 is an open end of a nozzle.

Figure 3:
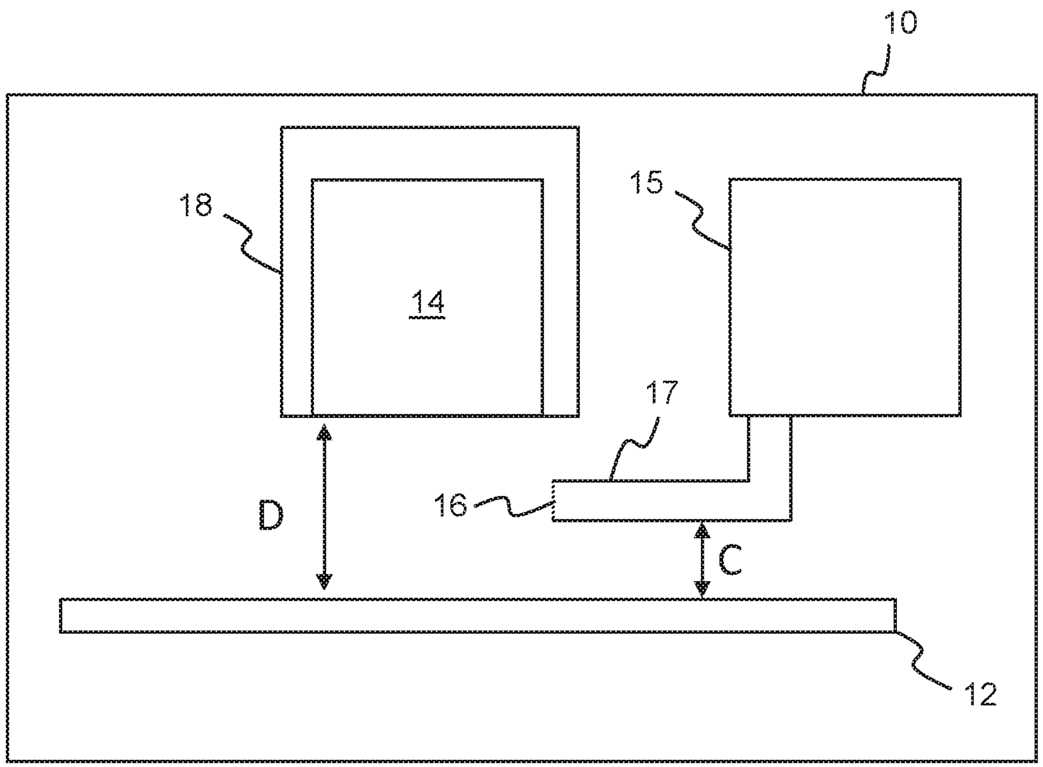
FIG. 3 is a schematic illustration of an example print apparatus.
Figure 4:
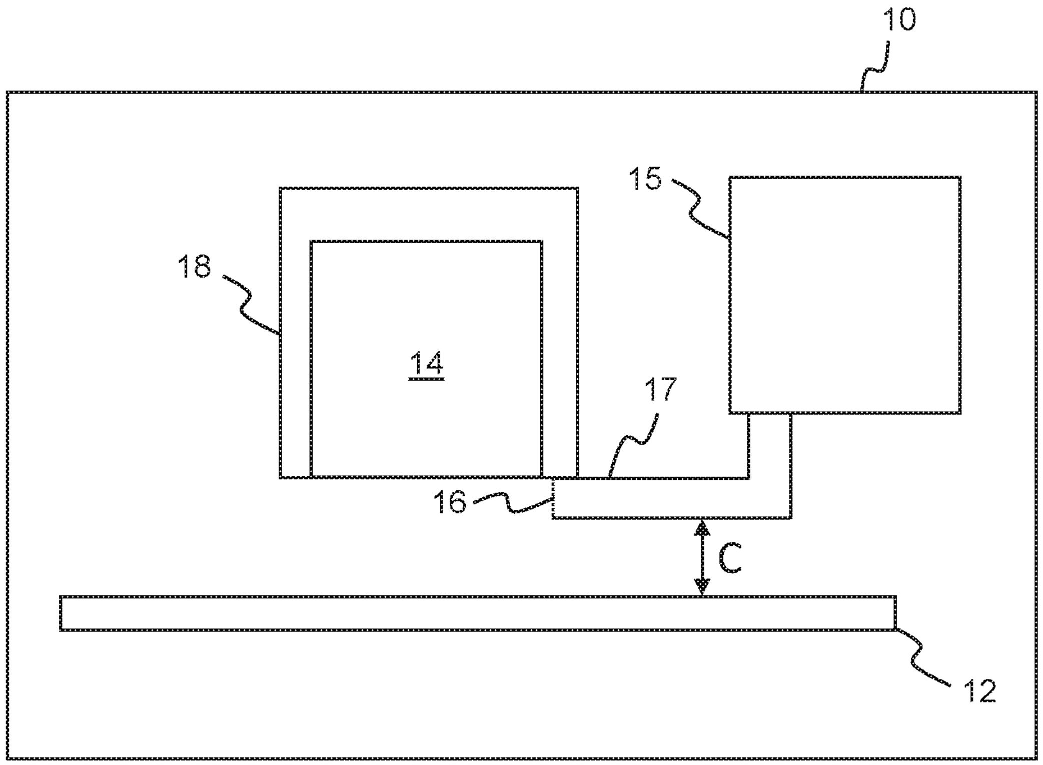
FIG. 4 is a further schematic illustration of the example print apparatus of FIG. 3.
Figure 5:
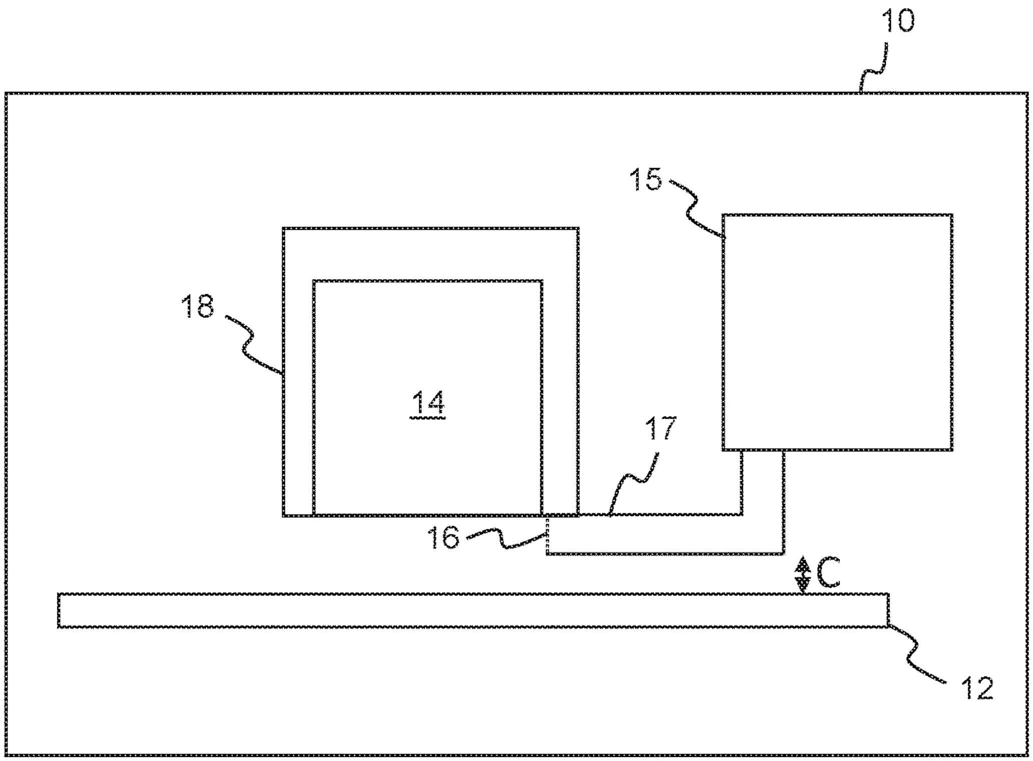
FIG. 5 is a further schematic illustration of the example print apparatus of FIG. 3.

FIGS. 3 to 5 are schematic illustrations of an example print apparatus 10 comprising: a platen 12 to support a print substrate (not shown); a print head 14 to apply print agent to the print substrate supported by the platen 12; and a suction device 15 having an inlet 16. The print head 14 is movable relative to the platen 12 to vary a distance D therebetween. The suction device 15 is to draw air from between the print head 14 and the platen 12 and into the inlet 16. The inlet 16 of the suction device 15 is movable with the print head 14 to vary a clearance C, between the inlet 16 and the platen 12. As illustrated in FIGS. 3 to 5, the inlet 16 is an open end 16 of a nozzle 17. The suction device 15 is to draw air from between the print head 14 and the platen 12 through the nozzle 17 (i.e. by way of the open end 16).

As further illustrated in FIGS. 3 to 5, the print head 14 is part of a print head assembly 18. For example, the print head assembly 18 may comprise a print head support (such as a print bar) to which the print head is attached. In some examples, the print head 14 is one of a plurality of print heads which are attached to the support (e.g. the print bar). In some examples, however, the print head assembly 18 is the print head 14.

The print head assembly 18 may be a laterally stationary print head assembly. It may be that the laterally stationary print head assembly 18 does not move laterally (i.e. in a plane parallel to the platen 12 and/or the print substrate) during printing, although the laterally stationary print head assembly 18 is movable in a direction perpendicular to the platen 12. Alternatively, it may be that lateral movement of the laterally stationary print head assembly 18 is restricted during printing. For example, it may be that any lateral movement of the laterally stationary print head assembly 18 (i.e. the distance moved by the print head assembly 18 in a lateral direction) during printing is small in comparison to any movement of the laterally stationary print head assembly 18 in a direction perpendicular to the platen 12 (i.e. the distance moved by the print head assembly 18 in the perpendicular direction). In some examples, the print head assembly 18 is a substrate-wide print head assembly comprising a plurality of laterally stationery print heads supported by a substrate-wide print bar (sometimes known as a 'page wide array' (PWA) print apparatus). In some examples, small lateral movements of the (i.e. entire) substrate-wide print bar are possible, although lateral movement of the individual laterally stationery print heads relative to one another may be restricted or prevented.

In the example shown in FIG. 3, the nozzle 17 is supported to adopt a standby position in which the open end 16 of the nozzle 17 is between the print head assembly 18 and the platen 12. The print head assembly 18 is to move relative to the platen 12 to engage the nozzle 17 (as illustrated in FIG. 4) and move it from the standby position (as illustrated in FIGS. 3 and 4) to an engaged position (as illustrated in FIG. 5), whereby the open end 16 of the nozzle 17 moves towards the platen 12. That is to say, the clearance C between the open end 16 and the platen 12 is smaller in the engaged position (i.e. FIG. 5) than in the standby position (i.e., FIGS. 3 and 4). The clearance C may be no greater than about 4 mm, for example, no greater than about 3 mm, or no greater than about 2 mm, when in the engaged position. For example, the clearance C may be from about 1 mm to about 4 mm, for example, from about 1 mm to about 3 mm, or from about 1 mm to about 2 mm, or from about 2 mm to about 3 mm, when in the engaged position.

The nozzle 17 may be formed from a resilient polymeric material. The nozzle 17 may be manufactured by injection moulding, i.e. the nozzle 17 may be an injection-moulded nozzle 17.

The print apparatus 10 may comprise a component support structure such as a housing. The suction device 15 and the print head 14 and/or the print head assembly 18 may be separately mounted to the component support structure. That is to say, the suction device 15 and the print head 14 and/or the print head assembly 18 may be mounted to the component support structure independently of one another. The suction device 15 and the print head 14 and/or the print head assembly 18 may therefore be movable independently of one another.

Figure 6:
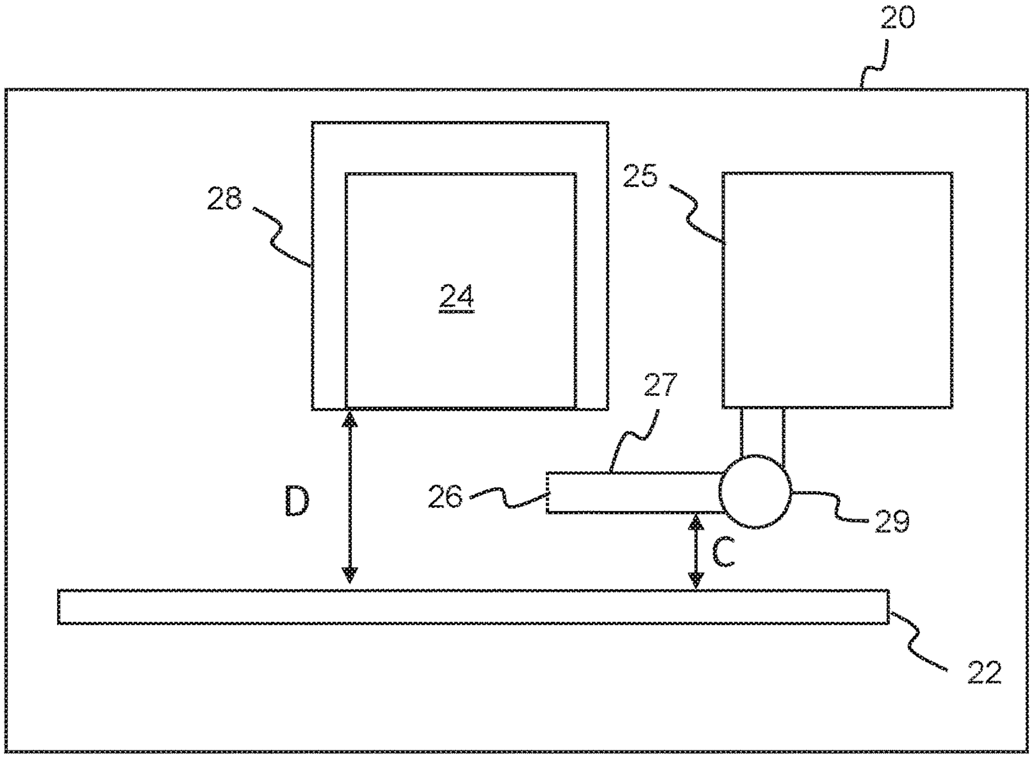
FIG. 6 is a schematic illustration of an example print apparatus.
Figure 7:
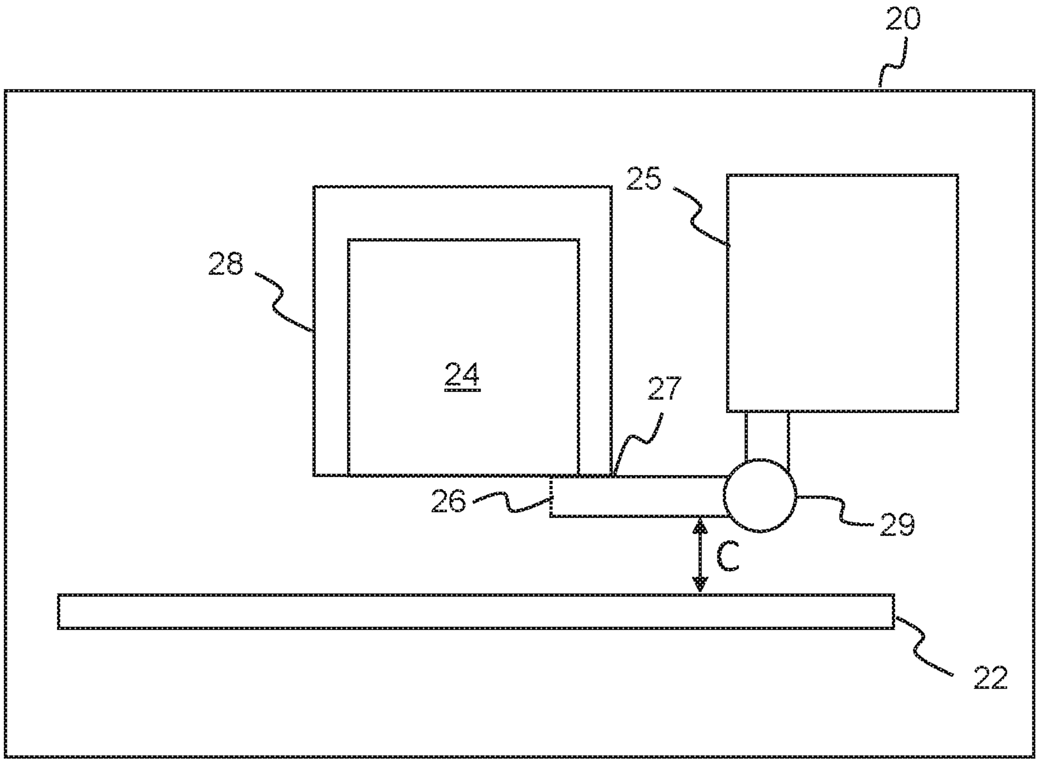
FIG. 7 is a further schematic illustration of the example print apparatus of FIG. 6.
Figure 8:
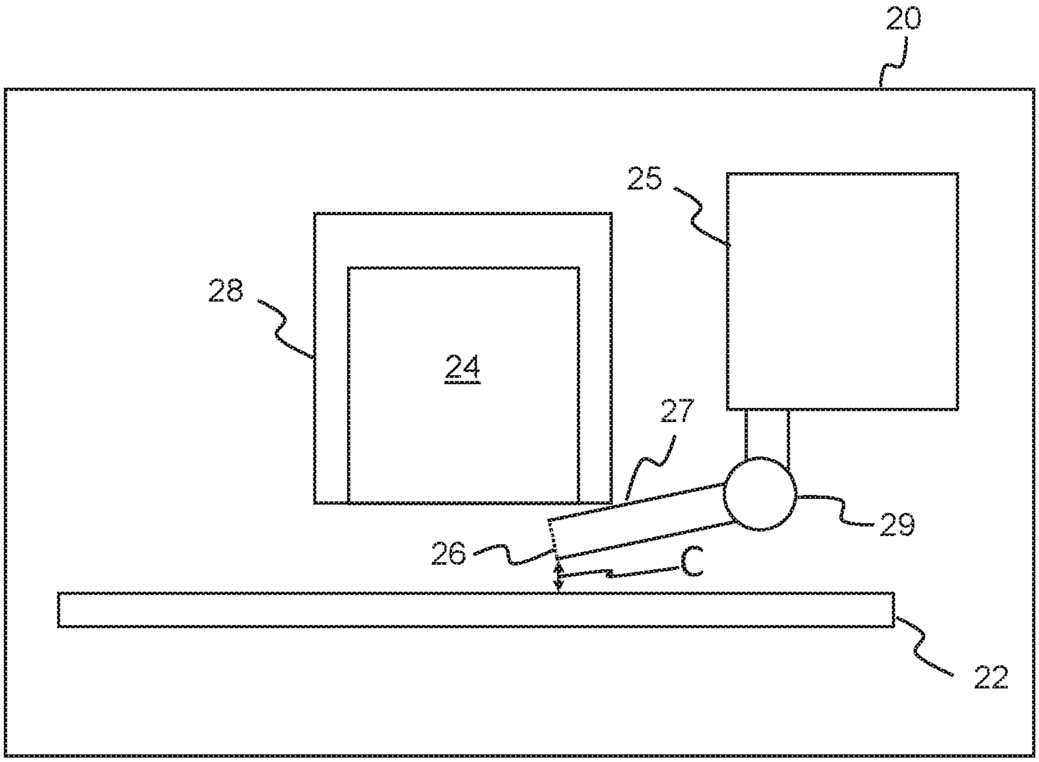
FIG. 8 is a further schematic illustration of the example print apparatus of FIG. 6.

FIGS. 6 to 8 are schematic illustrations of an example print apparatus 20 comprising: a platen 22 to support a print substrate (not shown); a print head 24 to apply print agent to the print substrate supported by the platen 22; and a suction device 25 having an inlet 26. The print head 24 is movable relative to the platen 22 to vary a distance D therebetween. The suction device 25 is to draw air from between the print head 24 and the platen 22 and into the inlet 26. The inlet 26 of the suction device 25 is movable with the print head 24 to vary a clearance C between the inlet 26 and the platen 22. As illustrated in FIGS. 6 to 8, the inlet 26 is an open end 26 of a nozzle 27. The suction device 25 is to draw air from between the print head 24 and the platen 22 through the nozzle 27 (i.e. by way of the open end 26). The nozzle 27 is hingedly attached to the suction device 25 at a pivot 29.

As further illustrated in FIGS. 6 to 8, the print head 24 is part of a print head assembly 28, For example, the print head assembly 28 may comprise a print head support (such as a print bar) to which the print head is attached. The print head 24 may be one of a plurality of print heads attached to the print head support (e.g. the print bar). In some examples, however, the print head 24 is the print head assembly 28.

The print head assembly 28 may be a laterally stationary print head assembly. It may be that the laterally stationary print head assembly 28 does not move laterally (i.e. in a plane parallel to the platen 22 and/or the print substrate) during printing, although the laterally stationary print head assembly 28 is movable in a direction perpendicular to the platen 22. Alternatively, it may be that lateral movement of the laterally stationary print head assembly 28 is restricted during printing. For example, it may be that any lateral movement of the laterally stationary print head assembly 28 (i.e. the distance moved by the print head assembly 28 in a lateral direction) during printing is small in comparison to any movement of the laterally stationary print head assembly 28 in a direction perpendicular to the platen 22 (i.e. the distance moved by the print head assembly 18 in the perpendicular direction). In some examples, the print head assembly 28 is a substrate-wide print head assembly comprising a plurality of laterally stationery print heads supported by a substrate-wide print bar (sometimes known as a 'page wide array' (PWA) print apparatus). In some examples, small lateral movements of the (i.e. entire) substrate-wide print bar are possible, although lateral movement of the individual laterally stationery print heads relative to one another may be restricted or prevented.

In the example shown in FIG. 6, the nozzle 27 is supported to adopt a standby position in which the open end 26 of the nozzle 27 is between the print head assembly 28 and the platen 22. The print head assembly 28 is to move relative to the platen 22 to engage the nozzle 27 (as illustrated in FIG. 7) and move it from the standby position (as illustrated in FIGS. 6 and 7) to an engaged position (as illustrated in FIG. 8), whereby the open end 26 of the nozzle 27 moves towards the platen 22. That is to say, the clearance C between the open end 26 and the platen 22 is smaller in the engaged position (i.e. FIG. 8) than in the standby position (i.e. FIGS. 6 and 7). As illustrated in FIGS. 7 and 8, movement of the open end 26 towards the platen 22 takes place by pivoting of the nozzle 27 about the pivot 29. The clearance C may be no greater than about 4 mm, for example, no greater than about 3 mm, or no greater than about 2 mm, when in the engaged position. For example, the clearance C may be from about 1 mm to about 4 mm, for example, from about 1 mm to about 3 mm, or from about 1 mm to about 2 mm, or from about 2 mm to about 3 mm, when in the engaged position.

The nozzle 27 may be formed from a resilient polymeric material. The nozzle 27 may be manufactured by injection moulding, i.e. the nozzle 27 may be an injection-moulded nozzle 27.

The print apparatus 20 may comprise a component support structure such as a housing. The suction device 25 and the print head 24 and/or the print head assembly 28 may be separately mounted to the component support structure. That is to say, the suction device 25 and the print head 24 and/or the print head assembly 28 may be mounted to the component support structure independently of one another. The suction device 25 and the print head 24 and/or the print head assembly 28 may, therefore, be movable independently of one another.

Figure 9:
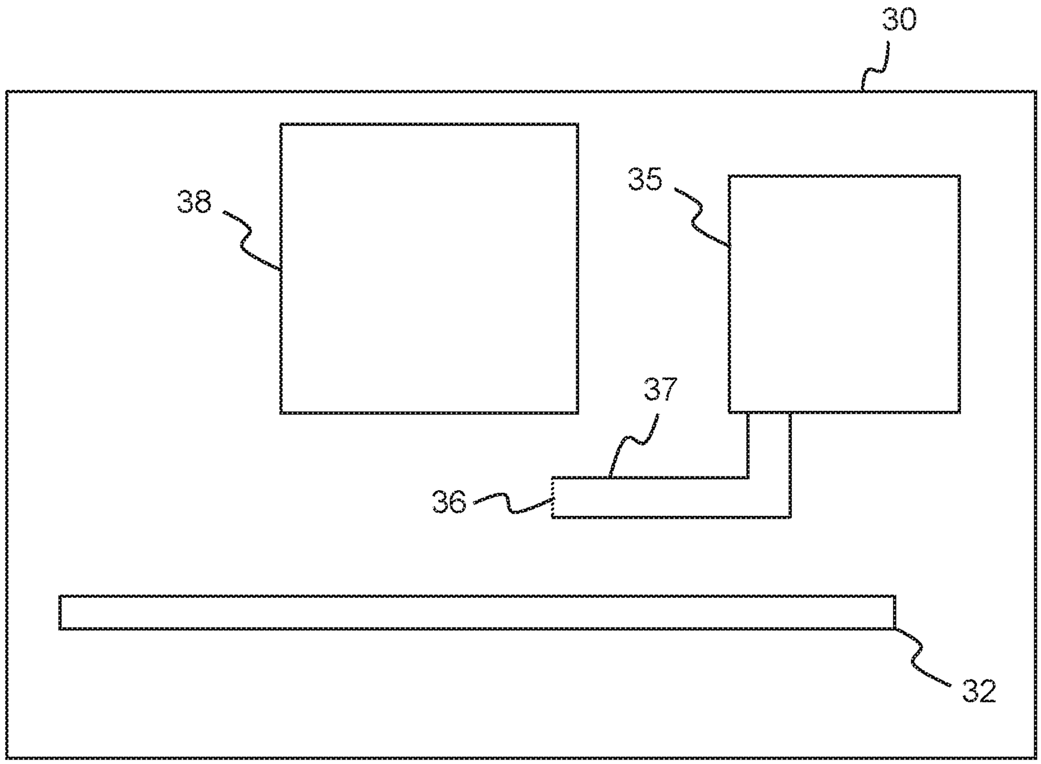
FIG. 9 is a schematic illustration of an example print apparatus.

FIG. 9 illustrates schematically an example print apparatus 30 comprising a print head assembly 38 to apply print agent to a print substrate supported by a platen 32 and a suction device 35 to draw air from between the print head assembly 38 and the platen 32 through a nozzle 37, wherein the nozzle 37 has an open end 36 which is movable towards the platen 32 by engagement of a portion of the print head assembly 38 with a portion of the nozzle 37. Movement of the open end 36 of the nozzle 37 towards the platen 32 may reduce a clearance between the open end 36 and the platen 32.

The print head assembly 38 may comprise a print head to apply print agent to the print substrate. For example, the print head assembly 38 may comprise a print head support (such as a print bar) to which the print head is attached. The print head assembly 38 may comprise a plurality of print heads attached to the print head support (e.g. the print bar).

The print apparatus 30 may comprise a component support structure such as a housing. The suction device 35 and the print head assembly 38 may be separately mounted to the component support structure. That is to say, the suction device 35 and the print head assembly 38 may be mounted to the component support structure independently of one another.

The open end 36 of the nozzle 37 may be biased away from the platen 32 but movable towards the platen 32 against the bias by engagement of the portion of the print head assembly 38 with the portion of the nozzle 37. For example, the nozzle 37 may be hinged to permit pivoting movement of the open end 36 of the nozzle 37 towards the platen 32 by engagement of the portion of the print head assembly 38 with the portion of the nozzle 37.

Figure 10:
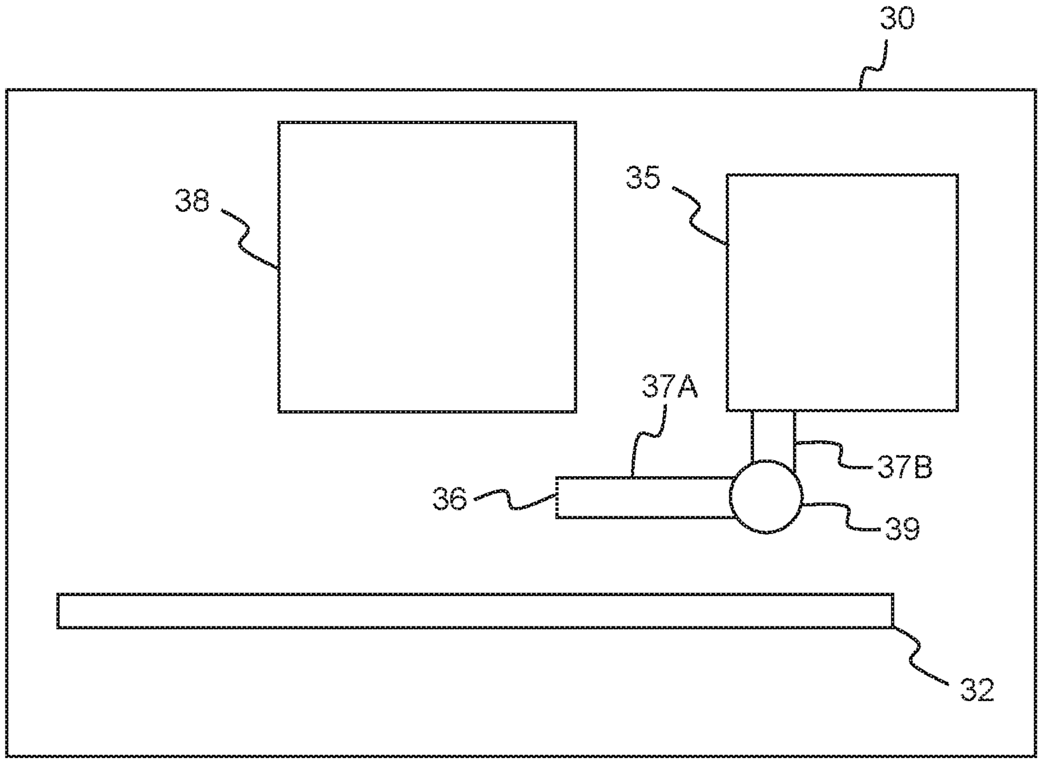
FIG. 10 is a further schematic illustration of the example print apparatus of FIG. 9.

The nozzle 37 may comprise a distal portion defining the open end 36 and a proximal portion attached to the suction device 35. The distal portion may be hingedly attached to the proximal portion at a hinge such that the distal portion is pivotable relative to the proximal portion about the hinge. For example, as illustrated schematically in FIG. 10, the nozzle 37 may comprise a distal portion 37A defining the open end 36 and a proximal portion 37B attached to the suction device 35. The distal portion 37A may be hingedly attached to the proximal portion 37B at a hinge 39 such that the distal portion 37A is pivotable relative to the proximal portion 37B about the hinge.

Figure 11:
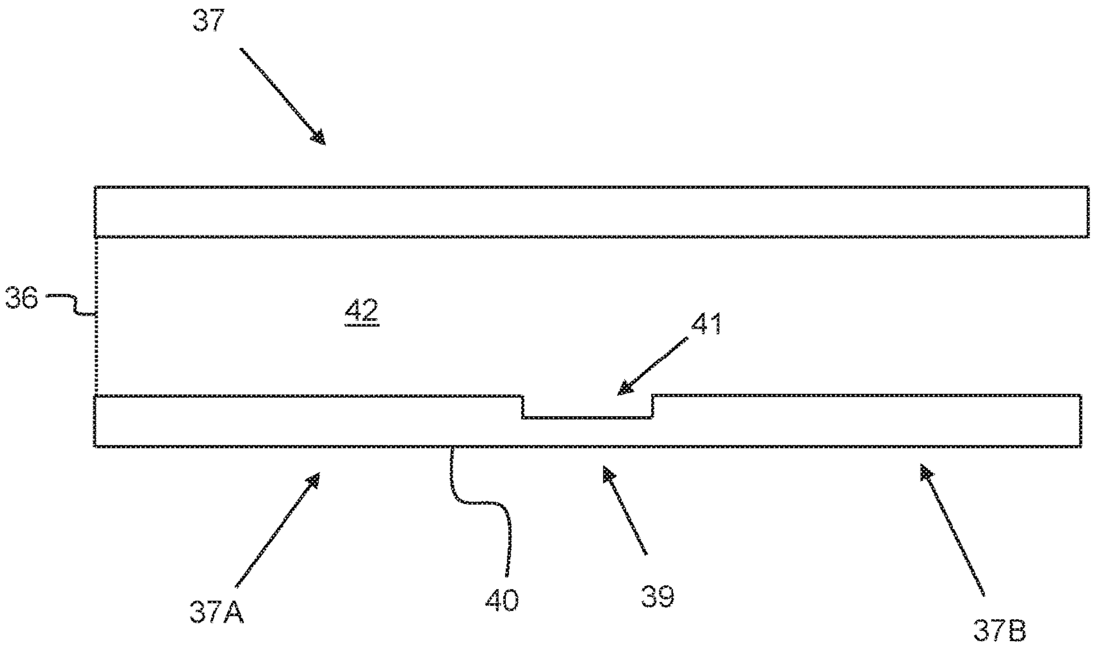
FIG. 11 is a schematic illustration of a portion of a nozzle of the example print apparatus of FIG. 9.

As illustrated schematically in FIG. 11, the nozzle 37 may have a nozzle wall 40 and the hinge 39 may be defined by a region 41 of the nozzle wall 40 having a reduced thickness (i.e. relative to adjacent regions of the nozzle wall 40). The nozzle wall 40 may define at least part of a nozzle conduit 42 through which air may be drawn into the suction device 35. Because the thickness of the nozzle wall 40 is reduced in region 41, the nozzle 37 may bend at region 41 when the print head assembly 38 engages the nozzle 37 and moves towards the platen 32, thereby causing distal portion 37A to pivot relative to proximal portion 37B about the hinge 39 formed by region 41.

The nozzle 37 may be formed from a resilient polymeric material. For example, it may be that the nozzle wall 40 (i.e. including any region 41 having a reduced thickness) is formed from a resilient polymeric material. The nozzle 37 may be manufactured by injection moulding, i.e. the nozzle 37 may be an injection-moulded nozzle 37.

It may be that the open end 36 is movable towards the platen 32 by engagement of the portion of the print head assembly 38 with a surface of the nozzle 37. The surface of the nozzle 37 may be an upper surface (e.g. an uppermost surface) of the nozzle 37. The surface of the nozzle 37 which is engaged by the portion of the print head assembly 38 may have a profile defined by a plurality of protrusions. The protrusions may be elongate ribs. The profile may be further defined by a plurality of recesses between the protrusions. In examples in which the protrusions are elongate ribs, the recesses may be elongate grooves. The protrusions may be arranged in a repeating pattern (i.e. a periodic array). Each protrusion may have a height (i.e., in a direction locally perpendicular to a profile of the nozzle 37) of at least about 0.5 mm, for example at least about 1 mm, for example from about 0.5 mm to about 2 mm. Accordingly, each recess ma have a depth (i.e., in a direction locally perpendicular to a profile of the nozzle 37) of at least about 0.5 mm, for example at least about 1 mm, for example from about 0.5 mm to about 2 mm. The protrusions and/or recesses may extend up to a distal-most tip of the nozzle 37.

The print head assembly 38 may be a laterally stationary print head assembly. It may be that the laterally stationary print head assembly 38 does not move laterally (i.e. in a plane parallel to the platen 32 and/or the print substrate) during printing, although the laterally stationary print head assembly 38 is movable in a direction perpendicular to the platen 32. Alternatively, it may be that lateral movement of the laterally stationary print head assembly 38 is restricted during printing. For example, it may be that any lateral movement of the laterally stationary print head assembly 38 (i.e. the distance moved by the print head assembly 38 in a lateral direction) during printing is small in comparison to any movement of the laterally stationary print head assembly 38 in a direction perpendicular to the platen 32 (i.e. the distance moved by the print head assembly 38 in the perpendicular direction). In some examples, the print head assembly 38 is a substrate-wide print head assembly comprising a plurality of laterally stationery print heads supported by a substrate-wide print bar (sometimes known as a 'page wide array' (PWA) print apparatus), In some examples, small lateral movements of the (i.e. entire) substrate-wide print bar are possible, although lateral movement of the individual laterally stationery print heads relative to one another may be restricted or prevented.

Figure 15:
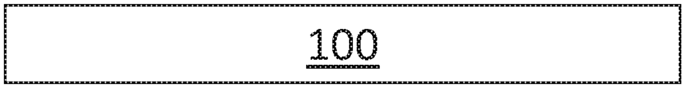
FIG. 15 is a flowchart illustrating an example method of operating a print apparatus.
Figure 16:
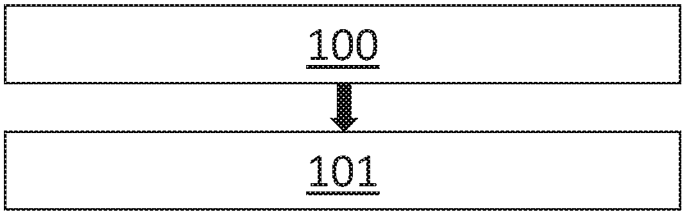
FIG. 16 is flowchart illustrating an example method of operating a print apparatus.

In some examples, a method (as illustrated schematically in FIGS. 15 and 16) of operating the print apparatus 30 (as illustrated schematically in FIG. 9) comprises: moving the print head assembly 38 towards the platen 32 to engage the portion of the nozzle 37 having the open end 36 between the print head assembly 38 and the platen 32, thereby causing movement of the open end 36 of the nozzle 37 towards the platen 32 (block 100 of FIGS. 15 and 16). The method may further comprise: drawing air from between the print head assembly 38 and the platen 32 through the nozzle 37 (i.e. by way of the open end 36) (block 101 of FIG. 16). The method may further comprise: while drawing air from between the print head assembly 38 and the platen 32 through the nozzle 37, the print head assembly 38 applying print agent to a print substrate (not shown) supported by the platen 32.

The method may comprise: moving the open end 36 of the nozzle 37 towards the platen 32 until a clearance between the open end 36 and the platen is no greater than about 4 mm, for example, no greater than about 3 mm, or no greater than about 2 mm. The method may comprise: moving the open end 36 of the nozzle 37 towards the platen 32 until the clearance between the open end 36 and the platen is from about 1 mm to about 4 mm, for example, from about 1 mm to about 3 mm, or from about 1 mm to about 2 mm, or from about 2 mm to about 3 mm. A minimum clearance of about 1 mm, for example, about 2 mm, may enable unimpeded passage of print substrate between the print head assembly 38 and the platen 32.

Figure 12:
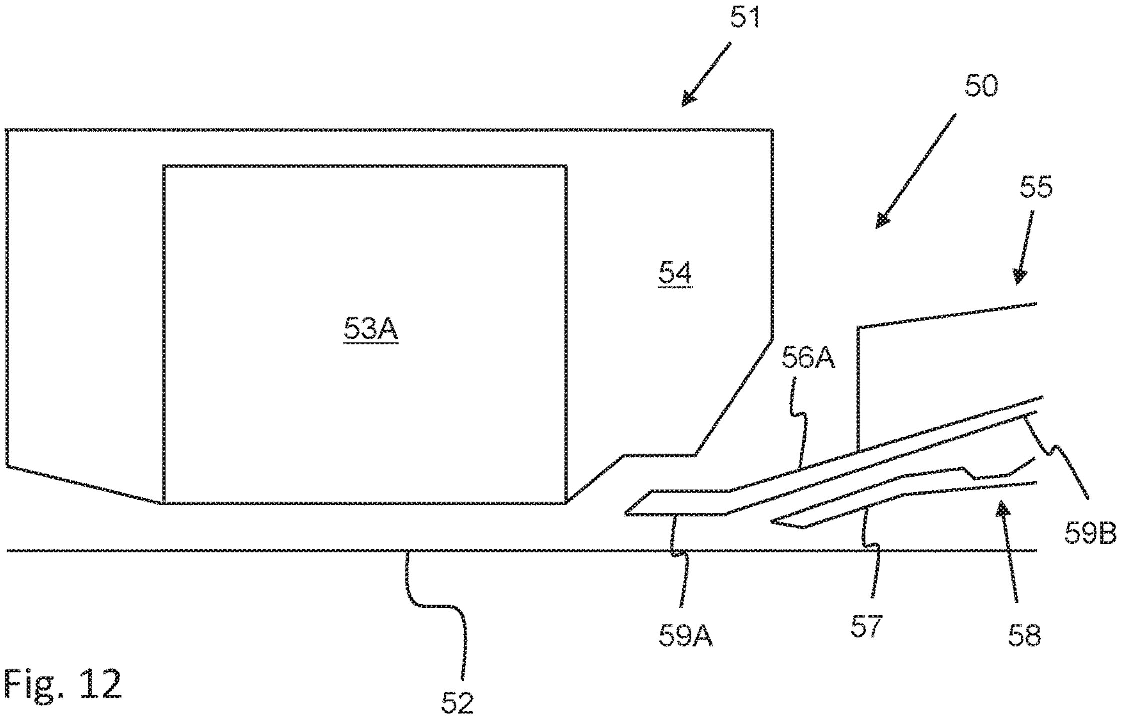
FIG. 12 is a schematic illustration of an example print apparatus.
Figure 13:
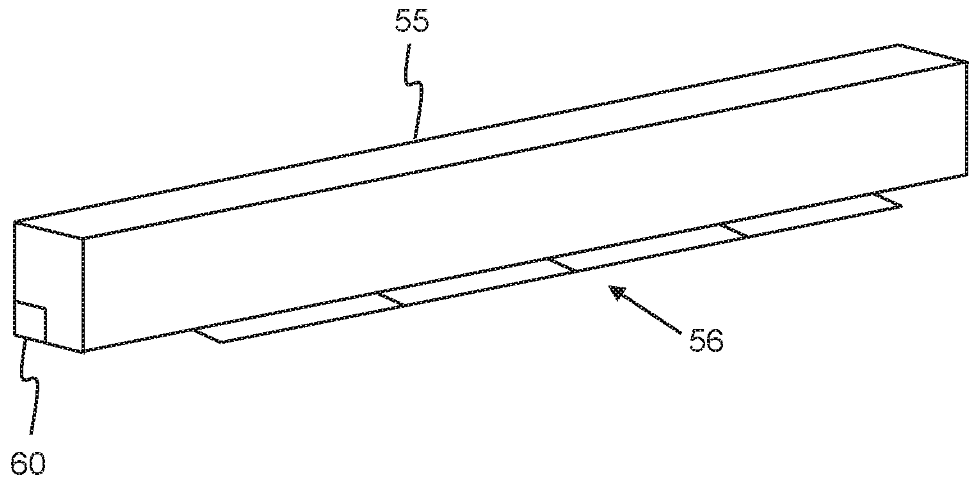
FIG. 13 is a schematic illustration of a suction device of the example print apparatus of FIG. 12.
Figure 14:
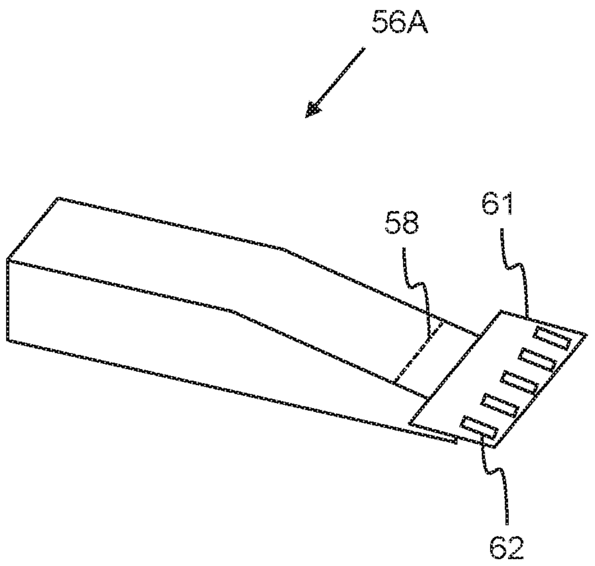
FIG. 14 is a schematic illustration of a nozzle of the example print apparatus of FIG. 12.

FIGS. 12, 13 and 14 illustrate schematically components of an example print apparatus 50. The print apparatus 50 comprises a print head assembly 51 to apply print agent to a print substrate supported by a platen 52. The print head assembly 51 comprises a plurality of print heads 53 supported across a width of the platen 52 by a print bar 54. The print apparatus 50 further comprises a suction device 55 to draw air from between the print head assembly 51 and the platen 52 through a plurality of nozzles 56, each of the plurality of nozzles 56 having a respective open end which is movable towards the platen 52 by engagement of a respective portion of the print head assembly 51 with a corresponding portion of the said nozzle.

FIG. 12 is a schematic sectional view of the print apparatus 50 showing an example print head 53A and nozzle 56A, The nozzle 56A has a nozzle wall 57 having a region 58 having a reduced thickness, Because the thickness of the nozzle wall 57 is reduced in region 58, the nozzle 56A bends at region 58 when the print head assembly 51 engages the nozzle 56A and moves towards the platen 52, thereby causing a distal portion 59A of the nozzle 56A to pivot relative to a proximal portion 59B about the region 58, which functions as a hinge. A distal portion of the uppermost portion of the nozzle 56A (i.e., the uppermost portion of the nozzle wall 57) extends further into the print zone (i.e. between the print head assembly 51 and the platen 52) than a distal portion of the lowermost portion of the nozzle 65A (i.e. the lower position of the nozzle wall 57). The distal portion of the uppermost portion of the nozzle 56A therefore provides a surface to be engaged by the print head assembly 51. The nozzle wall 57 may be formed from a resilient polymeric material. The nozzle wall 57 may be an injection moulded component.

As illustrated schematically in FIG. 13, the suction device 55 is supported across the width of the platen 52 by a support 60, such as a beam. The plurality of nozzles 56 are attached to the suction device 55 at one side.

The width of the platen may be at least about 10 inches (i.e. about 25 cm), for example, at least about 20 inches (i.e. about 51 cm), or at least about 30 inches (i.e. about 76 cm), or at least about 40 inches (i.e. about 102 cm).

One example nozzle 56A is shown in more detail in FIG. 14. The region 58 of the nozzle 56, about which the distal portion 59A may pivot, is indicated in FIG. 14 by a dashed line, A top surface 61 of the distal portion of the nozzle, which is engaged by the print head assembly 51 in use, has a profile defined by a plurality of protrusions in the form of a repeating pattern of elongate ribs 62, which also define a plurality of recesses therebetween. Due to the presence of the elongate ribs 62, some air may be drawn from outside the print zone into the print zone (and thereby into the nozzle 56A) over the top surface 61 of the nozzle 56A when the print head assembly 51 engages said top surface 61, This may result in a more uniform overall air flow into the print zone in examples in which a surface of the portion of the print head assembly 51 which engages the nozzle 56A is not uniform, for example where the portion of the print head assembly 51 which engages the nozzle 56A has a recess which might otherwise permit a localised increase in the rate of flow of air from outside the print zone into the print zone between the print head assembly 51 and the top surface of the nozzle 56A. Although the presence of the ribs 62, and any corresponding recesses therebetween, causes a small increase in the total volume of air which is drawn into the nozzle 56A from outside the print zone (in comparison to air drawn from within the print zone into the nozzle 56A), the ribs 62 also lead to a significantly more uniform air flow across the width of the nozzle 56A and therefore also within the print zone. Each rib may have a height (in a direction locally perpendicular to a profile of the nozzle) of at least about 0.5 mm, for example at least about 1 mm, for example from about 0.5 mm to about 2 mm.

However, the presence of the elongate ribs 62 is optional. For example, nozzles may not be provided with protrusions such as ribs in examples in which the surface of the portion of the print head assembly which engages the nozzles is uniform (e.g. in examples in which the portion of the print head assembly which engages the nozzles does not have a recess). In such examples, the surface of the print head assembly and the top surfaces of the nozzles may be flush with one another on engagement.

It will be understood that various modifications and improvements can be made without departing from the concepts described herein. Except where mutually exclusive, any of the features may be employed separately or in combination with any other features and the disclosure extends to and includes all combinations and sub-combinations of features described herein.

The invention claimed is:

1. Print apparatus comprising:

a platen to support a print substrate;

a print head to apply print agent to a print substrate supported by the platen, the print head being movable relative to the platen to vary a distance therebetween; and a suction device having an inlet, the suction device to draw air from between the print head and the platen and into the inlet;

wherein the inlet of the suction device is movable with the print head to vary a clearance between the inlet and the platen, wherein the suction device moves independent of the print head, wherein the inlet is an open end of a nozzle, the suction device being to draw air from between the print head and the platen through the nozzle, and wherein the print head is part of a print head assembly, wherein the nozzle is supported to adopt a standby position in which the open end of the nozzle is between the print head assembly and the platen, and wherein the print head assembly is to move relative to the platen to engage the nozzle and move it from the standby position to an engaged position, whereby the open end of the nozzle moves towards the platen.

2. The print apparatus according to claim 1, further comprising a component support structure, the suction device and the print head being separately mounted to the component support structure.

3. Print apparatus comprising a print head assembly to apply print agent to a print substrate supported by a platen and a suction device to draw air from between the print head assembly and the platen through a nozzle, wherein the nozzle has an open end which is movable towards the platen by engagement of a portion of the print head assembly with a portion of the nozzle, wherein the suction device moves independently from the print head assembly, wherein the nozzle is supported to adopt a standby position in which the open end of the nozzle is between the print head assembly and the platen, and wherein the print head assembly is to move relative to the platen to engage the nozzle and move it from the standby position to an engaged position, whereby the open end of the nozzle moves towards the platen.

4. The print apparatus according to claim 3, wherein the open end of the nozzle is biased away from the platen but movable towards the platen against the bias by engagement of the portion of the print head assembly with the portion of the nozzle.

5. The print apparatus according to claim 3, wherein the nozzle is hinged to permit pivoting movement of the open end of the nozzle towards the platen by engagement of the portion of the print head assembly with the portion of the nozzle.

6. The print apparatus according to claim 5, wherein the nozzle comprises a distal portion defining the open end and a proximal portion attached to the suction device, the distal portion being hingedly attached to the proximal portion at a hinge such that the distal portion is pivotable relative to the proximal portion about the hinge.

7. The print apparatus according to claim 6, wherein the nozzle has a nozzle wall and the hinge is defined by a region of the nozzle wall having a reduced thickness.

8. The print apparatus according to claim 3, wherein the nozzle is formed from a resilient polymeric material.

9. The print apparatus according to claim 3, wherein the open end is movable towards the platen by engagement of the portion of the print head assembly with a surface of the nozzle, the surface of the nozzle having a profile defined by a plurality of protrusions.

10. The print apparatus according to claim 3, wherein the print head assembly is a substrate-wide print head assembly comprising a plurality of laterally stationery print heads supported by a substrate-wide print bar.

11. A method of operating a print apparatus comprising:

moving a print head assembly towards a platen to engage a portion of a nozzle having an open end between the print head assembly and the platen, thereby causing movement of the open end of the nozzle towards the platen, wherein the nozzle moves independently from the print head assembly, wherein the nozzle draws air from between the print head assembly and the platen, wherein the nozzle is supported to adopt a standby position in which the open end of the nozzle is between the print head assembly and the platen, and wherein the print head assembly is to move relative to the platen to engage the nozzle and move it from the standby position to an engaged position, whereby the open end of the nozzle moves towards the platen.

12. The method according to claim 11, further comprising:

drawing air from between the print head assembly and the platen through the nozzle.

13. The method according to claim 12, further comprising:

while drawing air from between the print head assembly and the platen through the nozzle, the print head assembly applying print agent to a print substrate supported by the platen.

* * * * *